(12) United States Patent
Struble, Jr.

(10) Patent No.: US 10,703,590 B1
(45) Date of Patent: Jul. 7, 2020

(54) DRY MATERIAL DELIVERY SYSTEM FOR DRY BULK CONTAINERS

(71) Applicant: Roy Howard Struble, Jr., Howard, PA (US)

(72) Inventor: Roy Howard Struble, Jr., Howard, PA (US)

( * ) Notice: Subject to any disclaimer, the term of this patent is extended or adjusted under 35 U.S.C. 154(b) by 437 days.

(21) Appl. No.: 15/498,538

(22) Filed: Apr. 27, 2017

Related U.S. Application Data

(60) Provisional application No. 62/329,430, filed on Apr. 29, 2016.

(51) Int. Cl.
| | |
|---|---|
| *B65G 69/18* | (2006.01) |
| *B65G 53/26* | (2006.01) |
| *B65G 53/60* | (2006.01) |

(52) U.S. Cl.
CPC .......... *B65G 69/181* (2013.01); *B65G 53/26* (2013.01); *B65G 53/60* (2013.01)

(58) Field of Classification Search
CPC ....... B65G 53/26; B65G 53/60; B65G 69/181
See application file for complete search history.

(56) References Cited

U.S. PATENT DOCUMENTS

2016/0167897 A1* 6/2016 Wiemers ................ B65G 53/26
406/75

* cited by examiner

*Primary Examiner* — Andrew A Horton
(74) *Attorney, Agent, or Firm* — John J. Elnitski, Jr.

(57) ABSTRACT

A dry material delivery system adapted for unloading dry bulk material from a container. The system includes a dust collector unit and a main vacuum line connected to the dust collector unit. The vacuum line is attached to a vacuum source to pull a vacuum on the dust collector unit. The system includes a discharge unit attached to the container such that the discharge unit is movable. There is a connection between the dust collector unit and the discharge unit such that the applied vacuum by the main vacuum line causes suction to pull dust from the discharge unit. The system includes a product hose connected to the discharge unit that is also attached to a product discharge of the container to allow flow of dry bulk material from the container to the discharge unit.

10 Claims, 15 Drawing Sheets

DRY MATERIAL DELIVERY SYSTEM FOR DRY BULK CONTAINERS

This application claims the benefit of and incorporates by reference U.S. Provisional Application No. 62/329,430, filed Apr. 29, 2016.

BACKGROUND

The present invention generally relates to dry bulk material delivery. More specifically, the present invention relates to trailers used as dry bulk containers for delivery.

Dry bulk materials are typically delivered to a location using a trailer hauled by a truck. The trailer is used as a container to stow the dry bulk materials. Customers that receive the dry bulk material usually have a material handling system such as a silo to store the dry bulk material. There are some customers that receive the dry bulk material directly on the ground. The delivery of the dry bulk materials causes the release of dust that could create health and EPA issues that the customers wish to avoid. What is need is a delivery system between the delivery vehicle and the point of delivery which reduces dust emissions when unloading directly onto a surface instead of piping it into a silo.

It is an object of the present invention to provide a delivery system for dry bulk materials from a container that reduces dust emissions during delivery.

SUMMARY OF THE INVENTION

A dry material delivery system adapted for unloading dry bulk material from a container. The system includes a dust collector unit and a main vacuum line connected to the dust collector unit. The vacuum line is attached to a vacuum source to pull a vacuum on the dust collector unit. The system includes a discharge unit attached to the container such that the discharge unit is movable. There is a connection between the dust collector unit and the discharge unit such that the applied vacuum by the main vacuum line causes suction to pull dust from the discharge unit. The system includes a product hose connected to the discharge unit that is also attached to a product discharge of the container to allow flow of dry bulk material from the container to the discharge unit.

DETAILED DESCRIPTION

Figure 1:
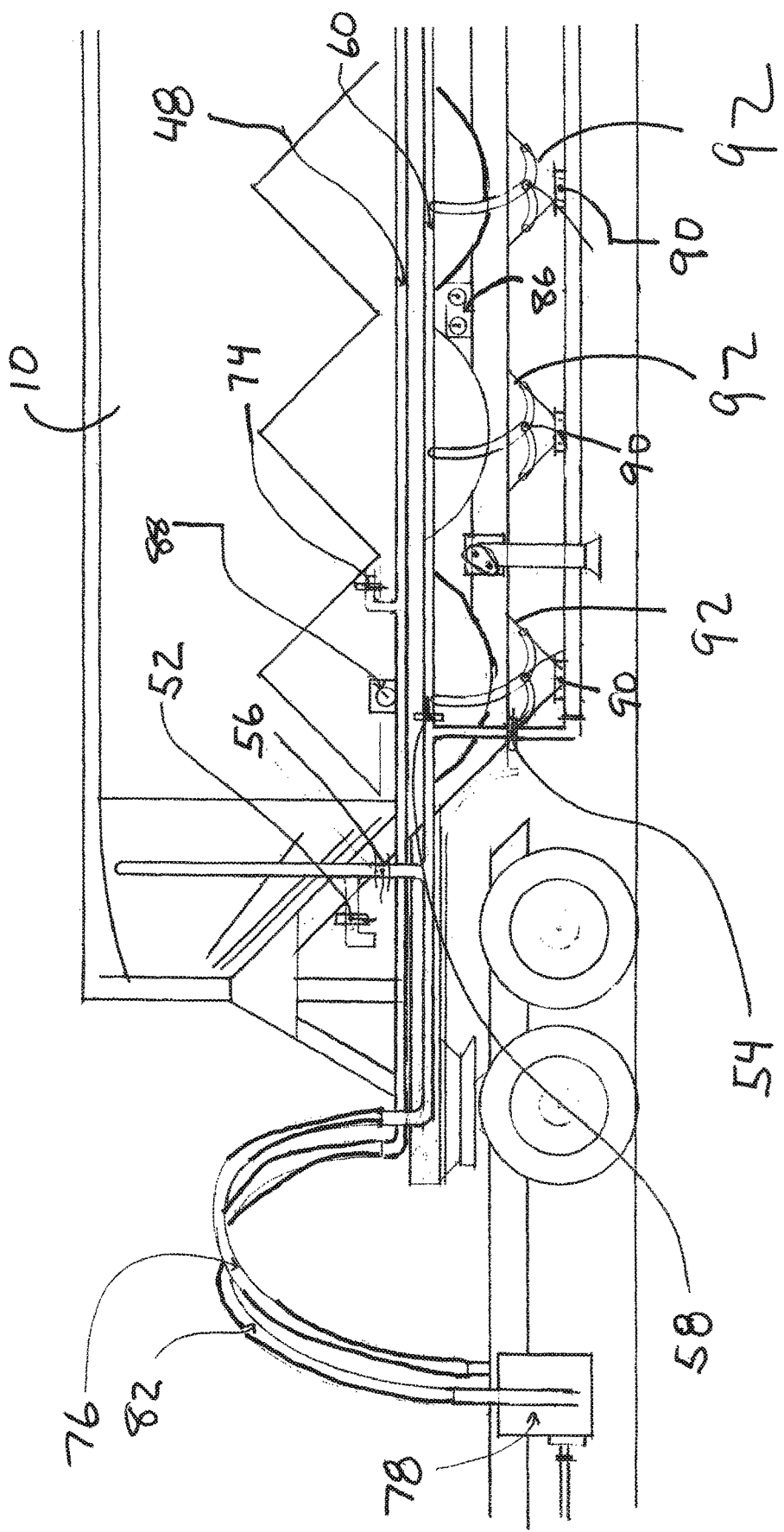
FIG. 1 is a side view of a front of a container according to the present invention.
Figure 2:
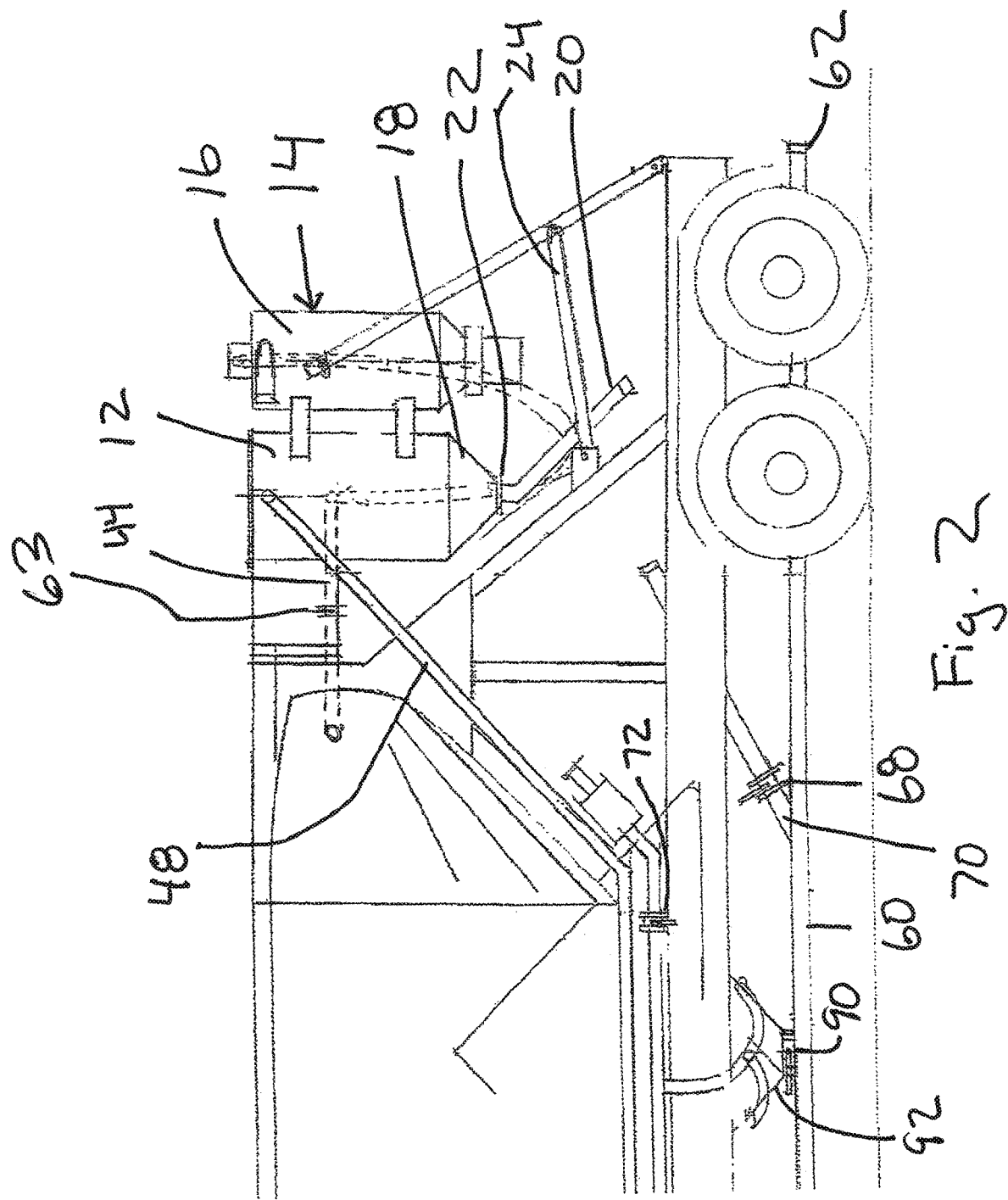
FIG. 2 is a side view of a rear of a container according to the present invention.

A dry material delivery system for use during unloading dry bulk material from dry bulk containers will be described. The dry bulk container is typically a trailer hauled by a truck, as shown in FIGS. 1-2. FIG. 1 shows the front of the container 10 and FIG. 2 shows the rear of the container 10. The trailer shown is one of many configurations of containers to hold dry bulk material and the dry material delivery system is not limited to the configuration shown. The container 10 is commonly referred to as a tank. The main components of the dust collection system include dust collector unit 12 and a discharge unit 14, as shown in FIG. 2. The dust collector unit 12 and discharge unit 14 are shown mounted to the container 10 for convenience of the dry material delivery system traveling with the container 10.

Figure 3:
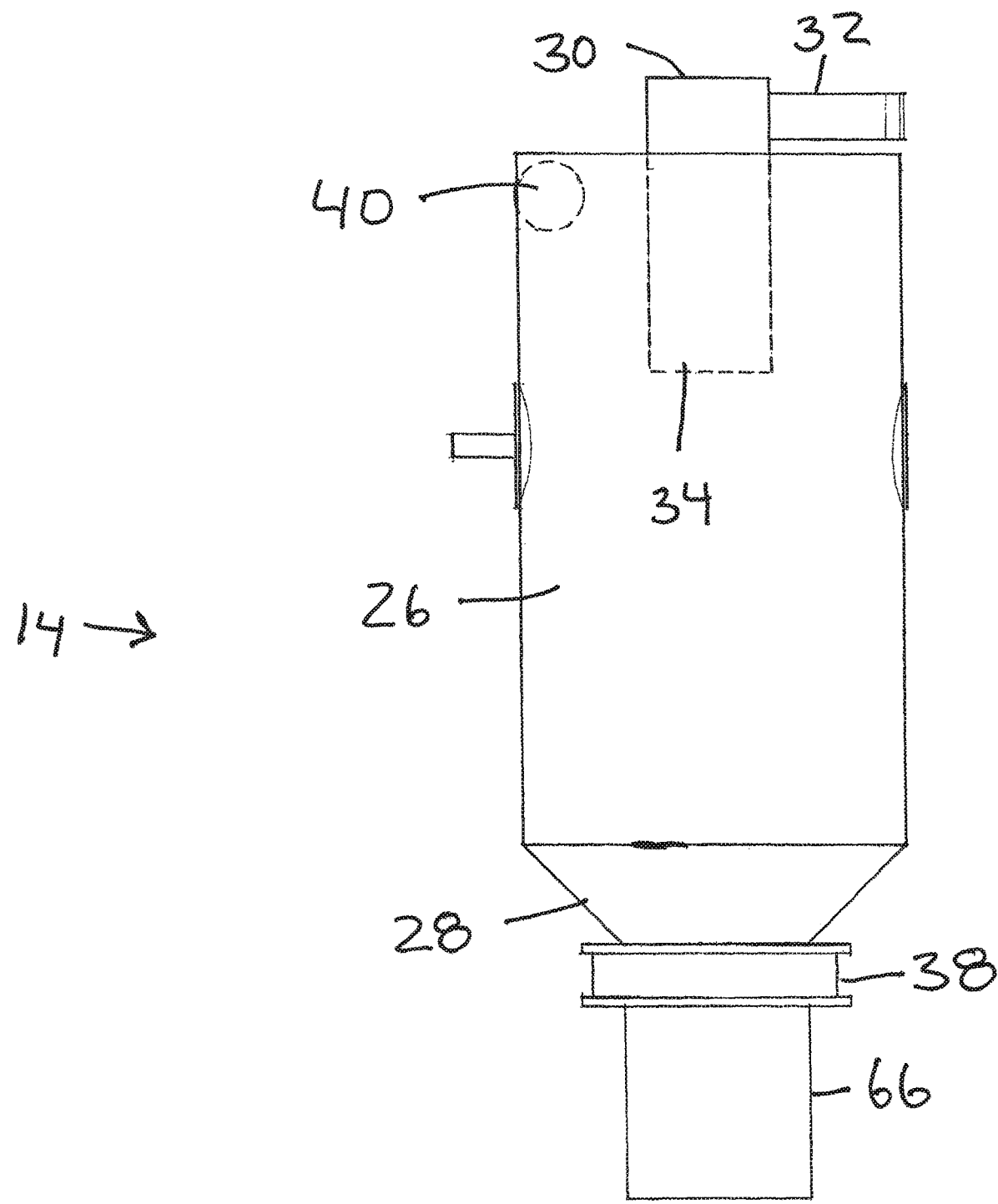
FIG. 3 is a side view of a dust collector unit according to the present invention.
Figure 4:
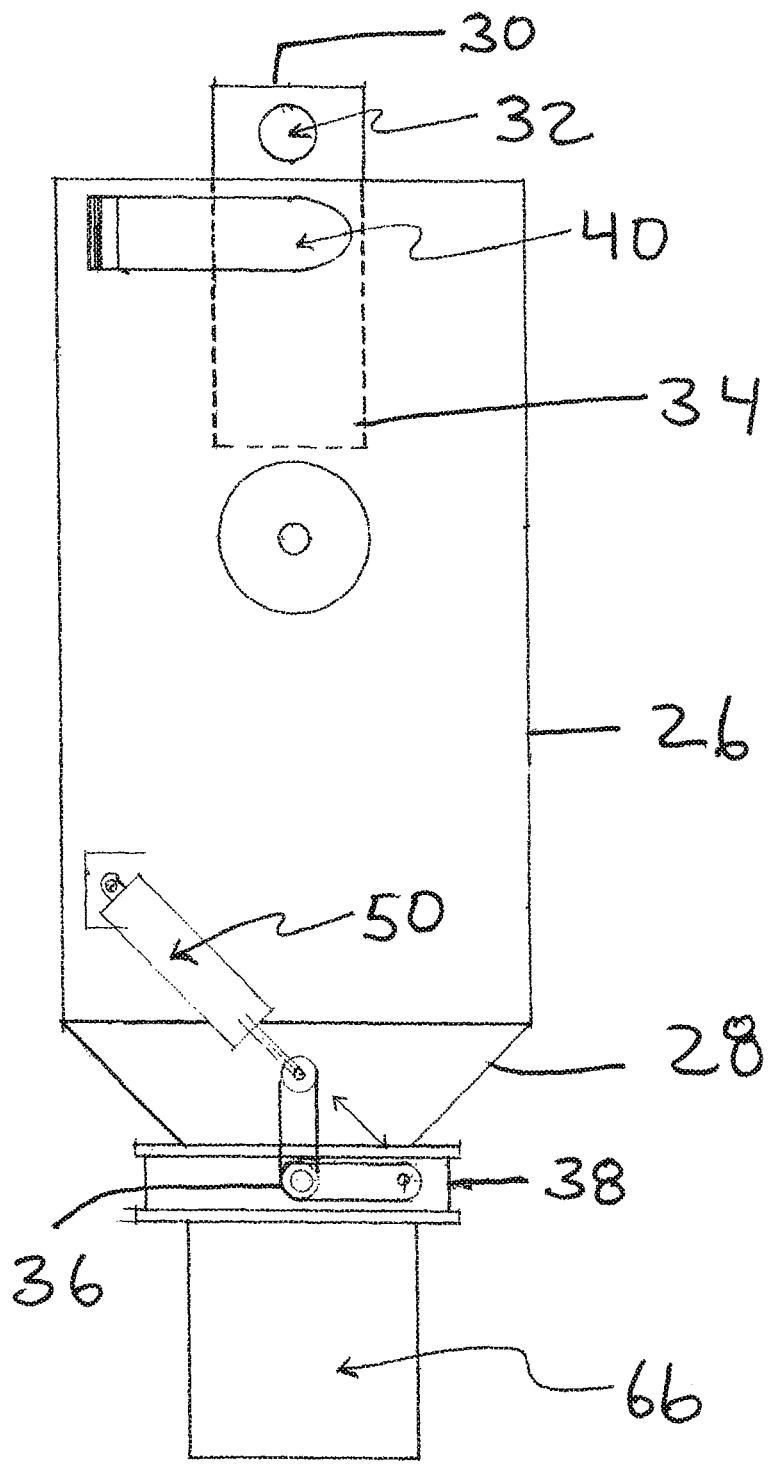
FIG. 4 is a rear view of a dust collector unit according to the present invention.
Figure 5:
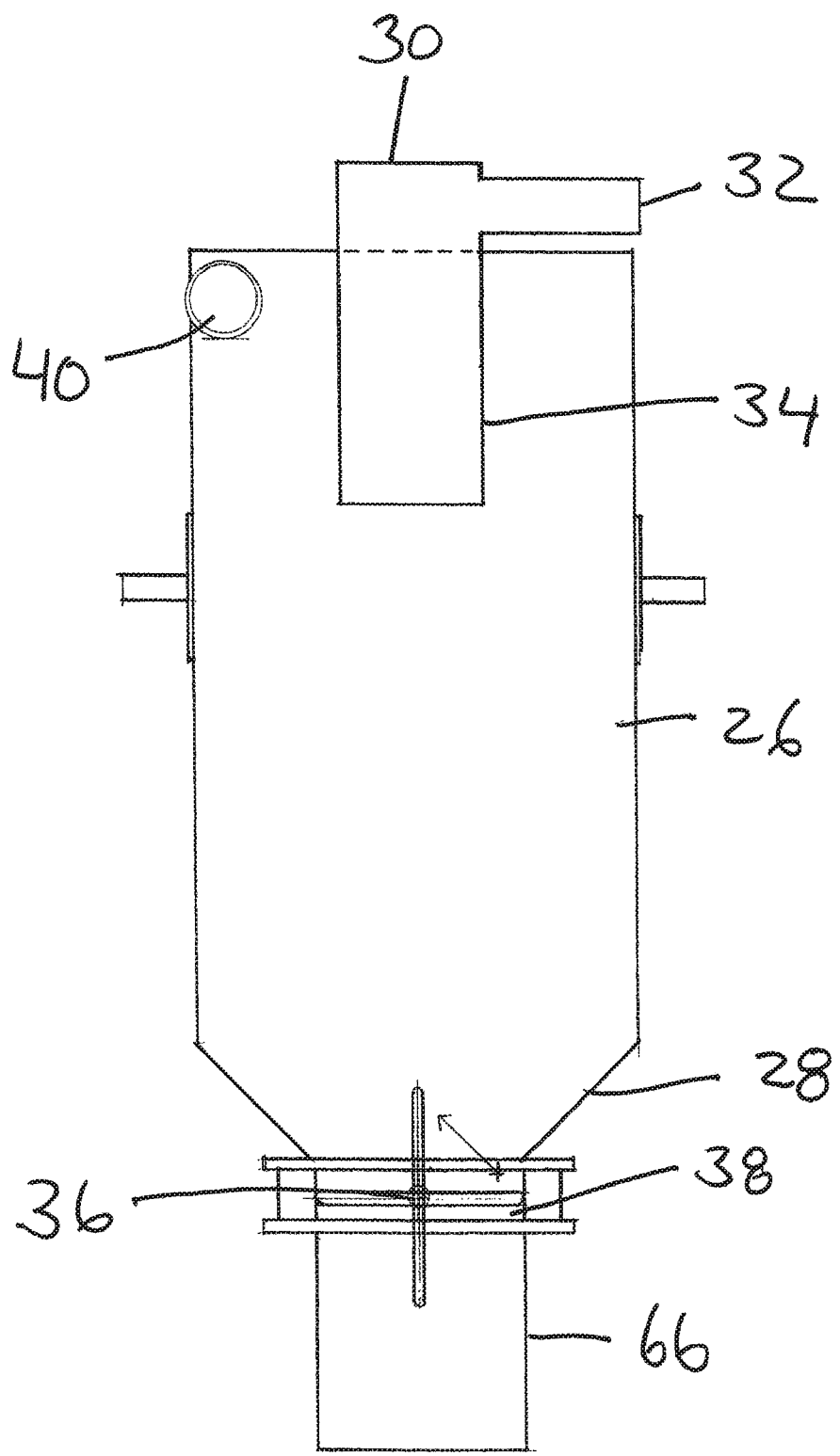
FIG. 5 is a rear cross sectional view of a dust collector unit according to the present invention.

The dust collector unit 12 is shown mounted in a fixed position on the back of the container 10 in FIG. 2. The dust collector unit 12 is a cylinder shape container 16 with a cone shape bottom 18. The dust collector unit 12 is sealed to allow the application of a vacuum. The dust collector unit 12 includes a discharge pipe 20 connected to an exit 22 of the cone shape bottom 18 to allow clean out of the dust collector unit 12. The discharge unit 14 is movable so that it can be stored in the position shown in FIG. 2, when the container 10 is moving. Hydraulic pistons 24 on each side of the discharge unit 14 are used to move the discharge unit 14 through the different positions. FIG. 3 shows a side view, FIG. 4 shows a rear view and FIG. 5 shows a rear cross sectional view of the discharge unit 14. The discharge unit 14 is shown as a sealed unit with an upper section 26 that is a cylinder that leads to a cone shape bottom 28. At the top of the upper section 26 is a vacuum head 30. The vacuum head 30 includes a suction port 32 which leads into a down tube 34. The down tube 34 projects downward inside of the upper section 26. The down tube 34 is designed to collect dust in the discharge unit 14 and send the dust out the suction port 32, when a vacuum is applied at the suction port 32. The cone shape bottom 28 includes a discharge valve 36 at an exit 38 of the cone shape bottom 28. The discharge unit 14 includes an inlet port to receive dry bulk material. The inlet port 40 leads into the upper section 26 to allow the dry bulk material to drop downward toward the exit 38 of the cone shape bottom 28. The inlet port 40 is shown near the top of the discharge unit 14 and above a bottom 42 of the down tube 34.

The dust collector unit 12 is connected by hoses to the container 10 and the discharge unit 14 in order to collect dust from both the container 10 and the discharge unit 14. A container dust collection pipe 44 is connected between the container 10 and the dust collector unit 12 and a discharge dust collection hose 46 is connected between the dust collector unit 12 and the suction port 32 of the discharge unit 14. A main vacuum line 48 is connected to the dust collector unit 12 to create a vacuum pulling force in the dust collector unit 12, in order to pull dust from either the container dust collection pipe 44 or the discharge dust collection hose 46. The discharged unit 14 is moved into position shown in FIG. 6 for setup and moved into position shown in FIG. 7 for discharge of dry bulk material from the container 10. An air cylinder 50 is shown in FIG. 4 to operate the discharge valve 36 and allow flow the dry bulk material through the exit 38.

Figure 6:
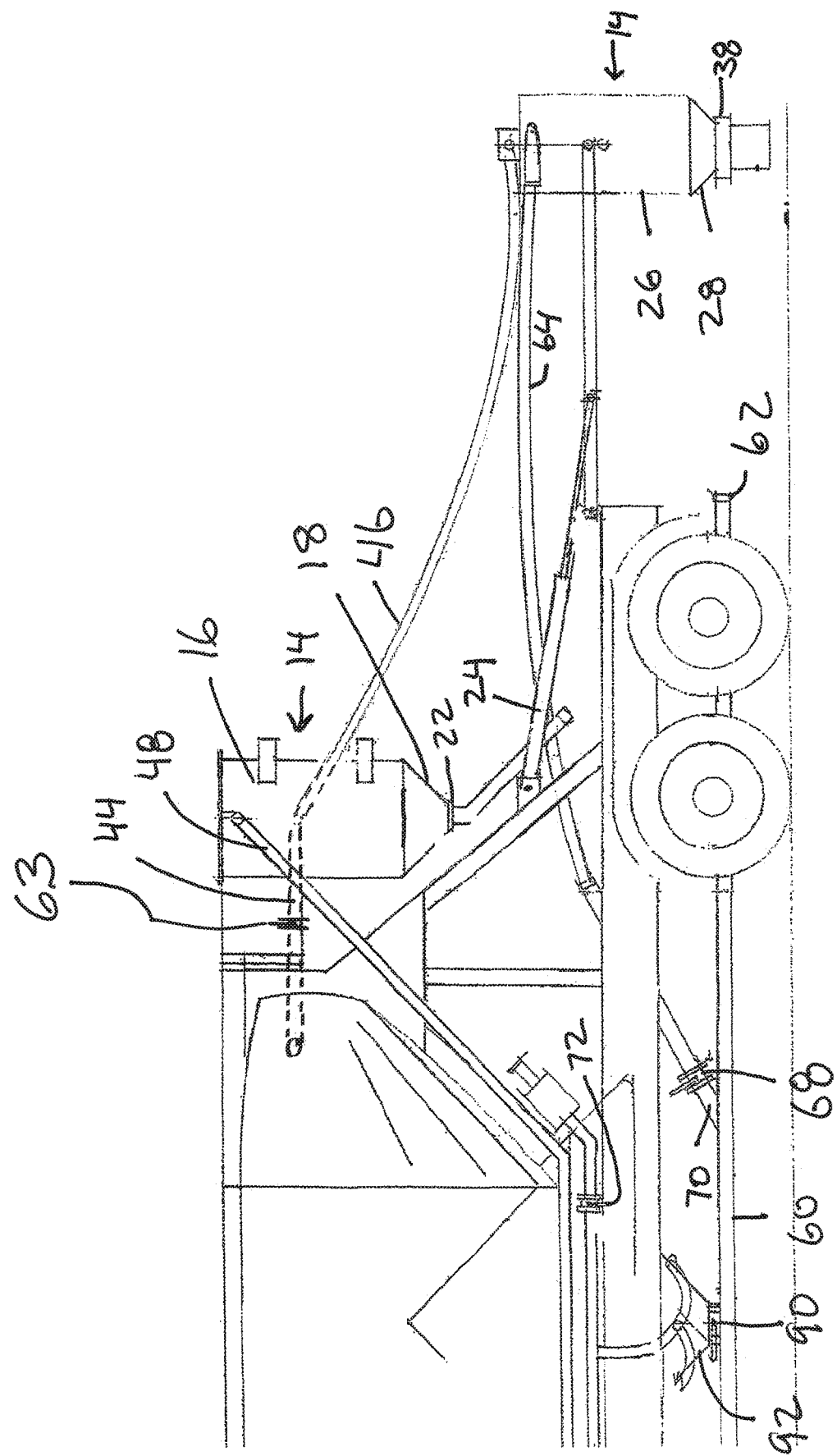
FIG. 6 is a side view of a rear of a container according to the present invention.
Figure 7:
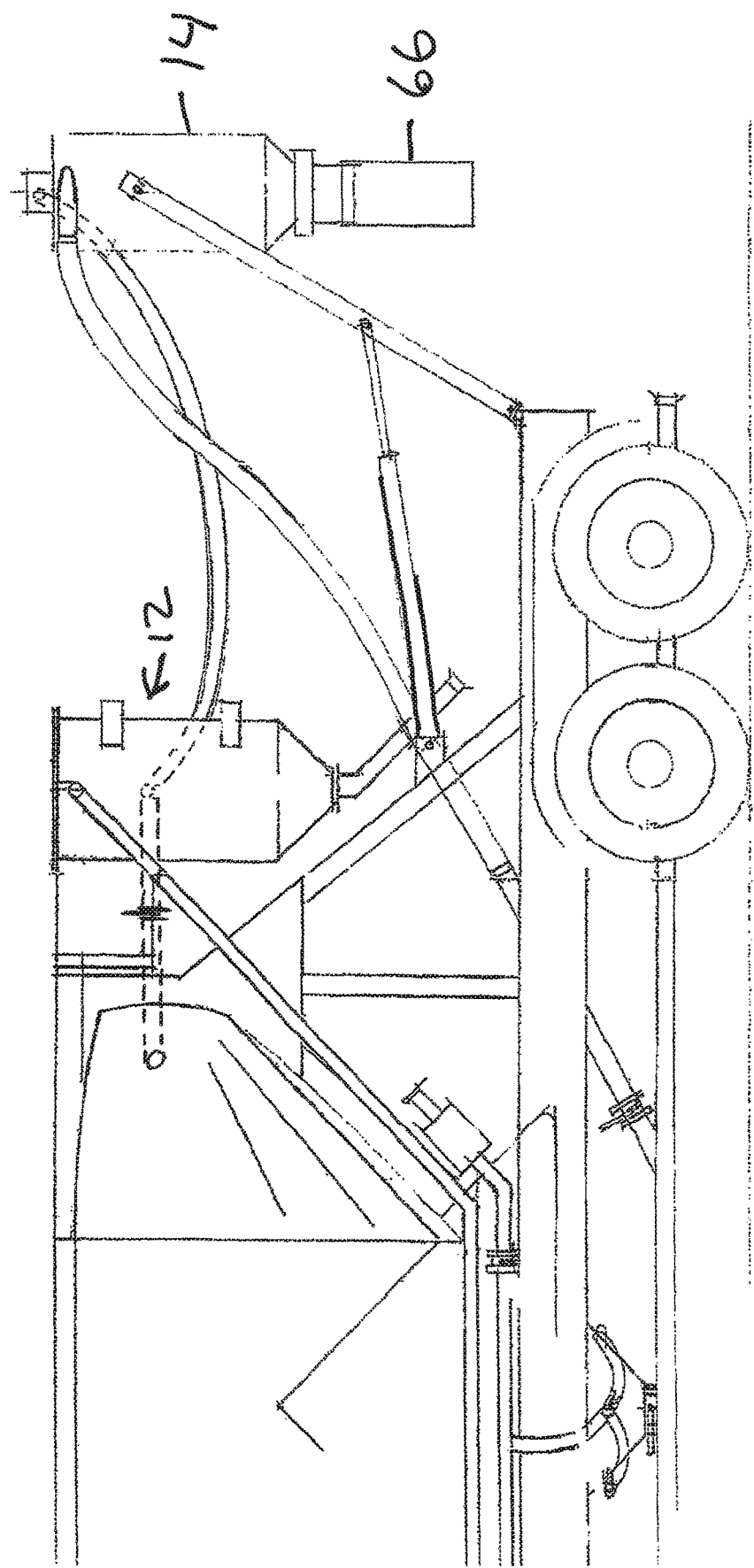
FIG. 7 is a side view of a rear of a container according to the present invention.

FIGS. 1 and 6 show components on the container 10 that are used as part of the dust collection system when discharging dry bulk material. Prior to discharge of the dry bulk material from the container 10, a blowdown valve 52 is closed, a product air valve 54 is closed and a top air valve 56 is closed. An agitator valve 58 is open. A product discharge pipe 60 is capped at its exit 62 and the discharge valve 36 on the discharge unit 14 is closed. A container vacuum valve 63 at the container dust collection pipe 44 is opened. The discharge unit 14 is lowered into position as shown in FIG. 6 to install the discharge hose 64 and discharge dust collection hose 46. A dust sock 66 is installed on the bottom of the discharge unit 14. A product diverter valve 68 located near the rear of the container 10 is opened to allow product flow through the discharge hose 64, instead of the exit 62 of the product discharge pipe 60. The product diverter valve 68 is connected between the discharge hose 64 and a Y-pipe 70. The Y-pipe 70 is added to the product discharge pipe 60 to allow diverting of the dry bulk material from the exit 62 of the product discharge pipe 60. The discharge unit 14 is raised to a position to allow unloading the material, as shown in FIG. 7. A tank pressure diverter valve 72 located near the rear of the container 10 is closed. A vacuum diverter valve 74 near the front of the container 10 is opened. A pressure hose 76 from a blower 78 on the truck is connected to a main airline 80 on the container 10 and main vacuum hose 82 from the blower 78 is connected to a main vacuum line 48 on the container.

To unload the container 10 the following pre-unloading procedure can be performed when the dust collector unit 12 is used. The blower 78 is engaged to 1000 rpm. The tank top airline valve 56 near the front of the container 10 is closed to start agitation of the dry bulk material for about five minutes. Dusty air in the container 10 is diverted to the dust collector unit 14 by way of the container dust collection pipe 44 during the agitation of the dry bulk material by having a vacuum applied to the dust collector unit 12, using the main vacuum line 48. The blower 78 is then shut down and any excess air pressure is to be vented through into the dust collector unit 12, using the container vacuum valve 63 in an open position and vacuum diverter valve 74 is in an open position to the atmosphere.

Next are the steps for the unloading of the container. The tank pressure diverter valve 72 is moved to a mid-position and the vacuum diverter valve 74 is moved to a mid-position. The mid-position of the tank pressure diverter valve 72 and the vacuum diverter valve 74 is a starting place until fine tuning adjustments of the tank pressure diverter valve 72 and the vacuum diverter valve 74 can be made. The blower 78 is reengaged to maintain 1,000 rpm. The tank pressure diverter valve 72 is adjusted to maintain 6 psi, which is displayed on gauge 86. The vacuum diverter valve 74 is adjusted to maintain one to two pounds of vacuum, which is displayed on gauge 88. During this time the dry bulk material will be agitated.

To discharge the dry bulk material, there are four product valves 90 shown as part of the container 10. To start the discharge process, the discharge valve 36 on the discharge unit 14 is fully opened. The product air valve 54 is opened a quarter of the way and the first of the four product valves 90 is opened a half of the way. While maintaining visual site of the dust sock 66, one verifies there is no excess dust as dry bulk material is delivered to ground from the discharge unit 14. An average of six pounds product air and one to two inches of vacuum is maintained by adjusting positions of product air valve 54, product valve 90, tank pressure diverter valve 72 and vacuum diverter valve 74. These procedures for unloading, pressures and vacuum cited are for standard containers used in the industry and may have to be changed based on the container and its setup. As the pile of dry bulk material increases, the discharge unit 14 may need to be raised upward. The operator continues adjusting pressures until the pocket 92 above the first product valve 90 is about to empty. When the first product valve 90 is about to empty, close the discharge valve 36 and close the current open product valve 90, then open the next product valve 90 and the discharge valve 36. Repeat the processes of monitoring the pressures. Continue this procedure until the last product pocket 92 is about empty. During the process, the shape of the discharge unit 14 provides a cyclonic action as the dry bulk material drops downward toward the exit 38. This cyclonic action allows the heavier material to drop, while the dust particles get caught up in the vacuum that is applied.

The clean out procedure of the container 10 is as follows to remove lingering dry bulk material in the container 10. All products valves 90 are closed. The discharge valve 36 is opened. The blower rpm is reduced to idle to reduce tank pressure to one to two pounds. Repeat product unloading procedure described before for each product valve 90, while maintaining the lower air pressures until product pockets 92 are empty. After the last product valve 90 is emptied and closed, open the blowdown valve 52 to vent off any excess tank pressure. Close the discharge valve 36, shut down blower 78 and disconnect hoses 76 and 82 for storage. Lower the discharge unit 14 to ground level to disconnect and store hoses 46 and 64, then replace any covers on pipes, remove dust sock 66, and retract discharge unit 14 to travel position.

Figure 8:
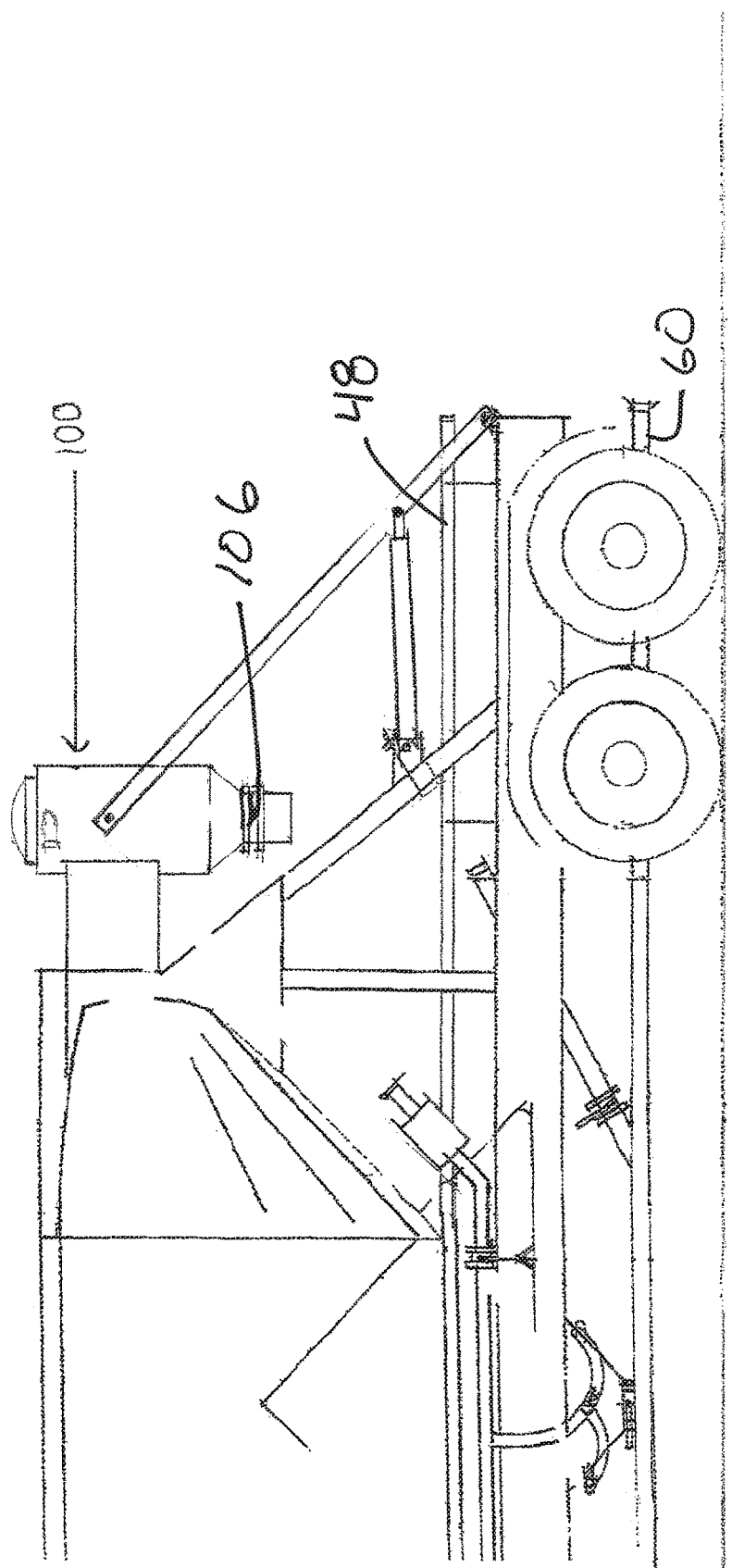
FIG. 8 is a side view of a rear of a container according to the present invention.
Figure 9:
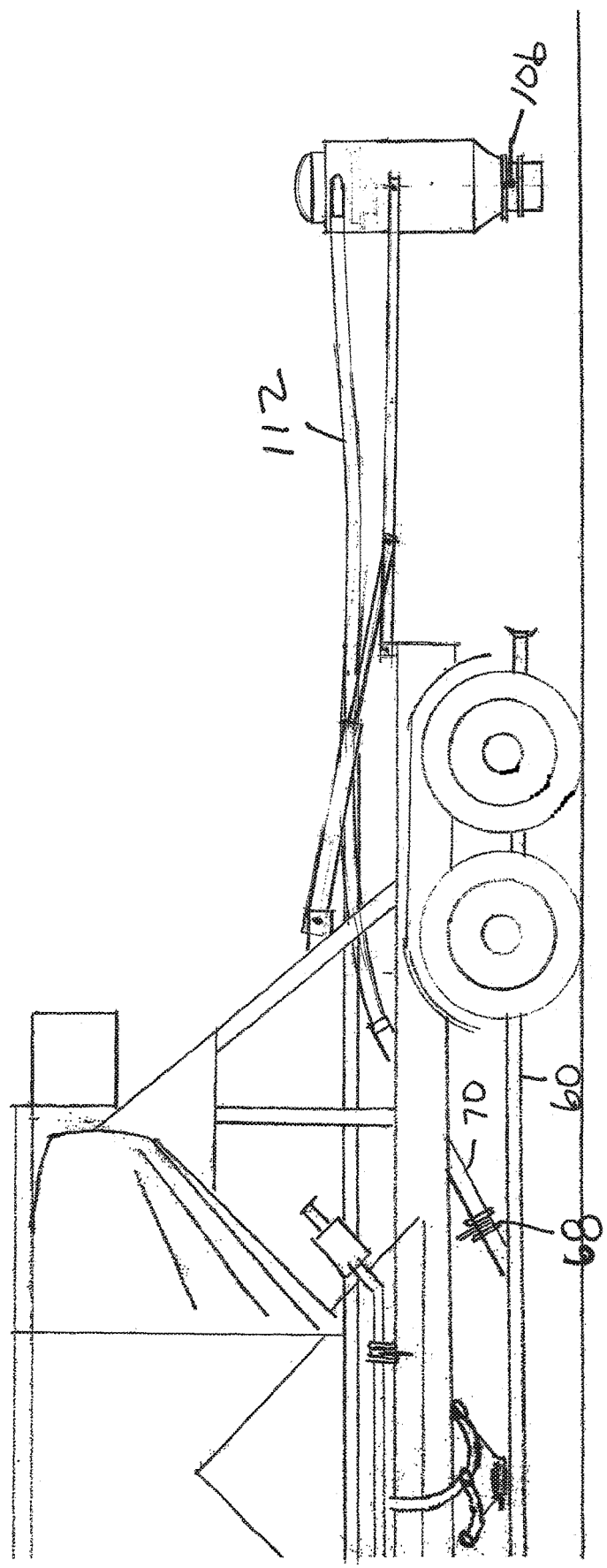
FIG. 9 is a side view of a rear of a container according to the present invention.
Figure 10:
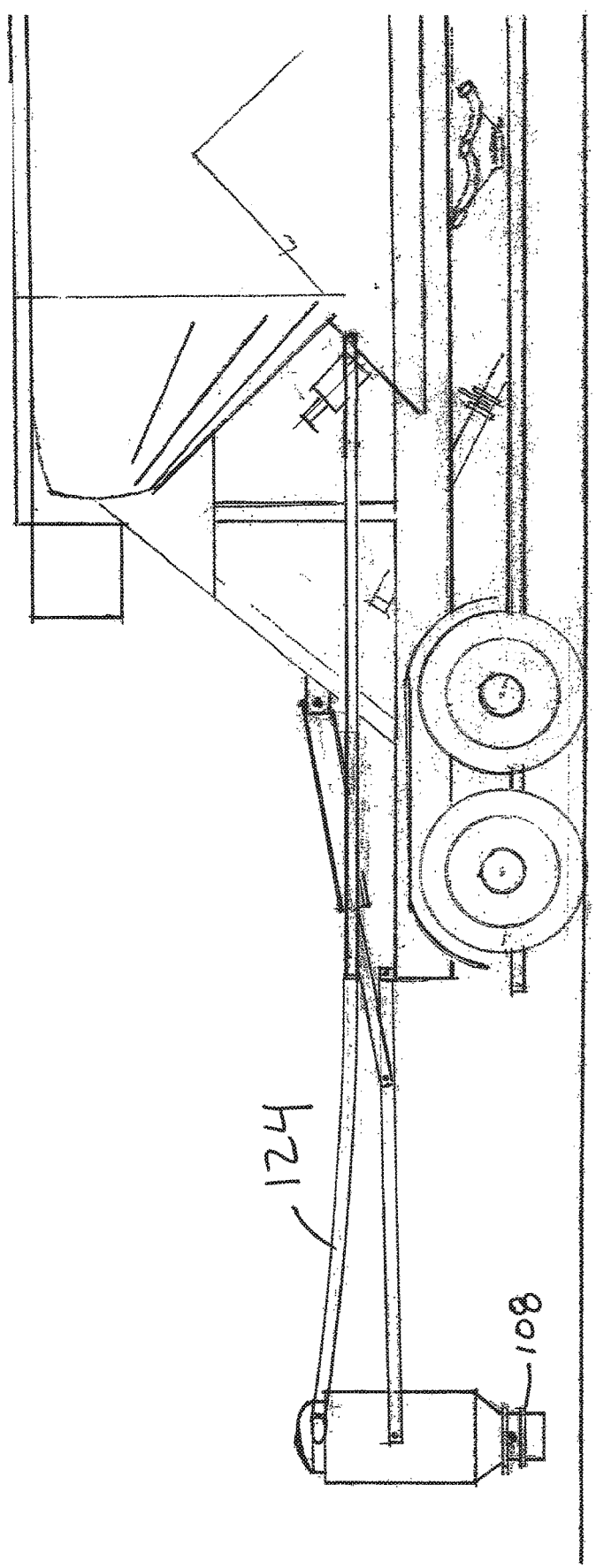
FIG. 10 is a side view of a rear of a container according to the present invention.
Figure 11:
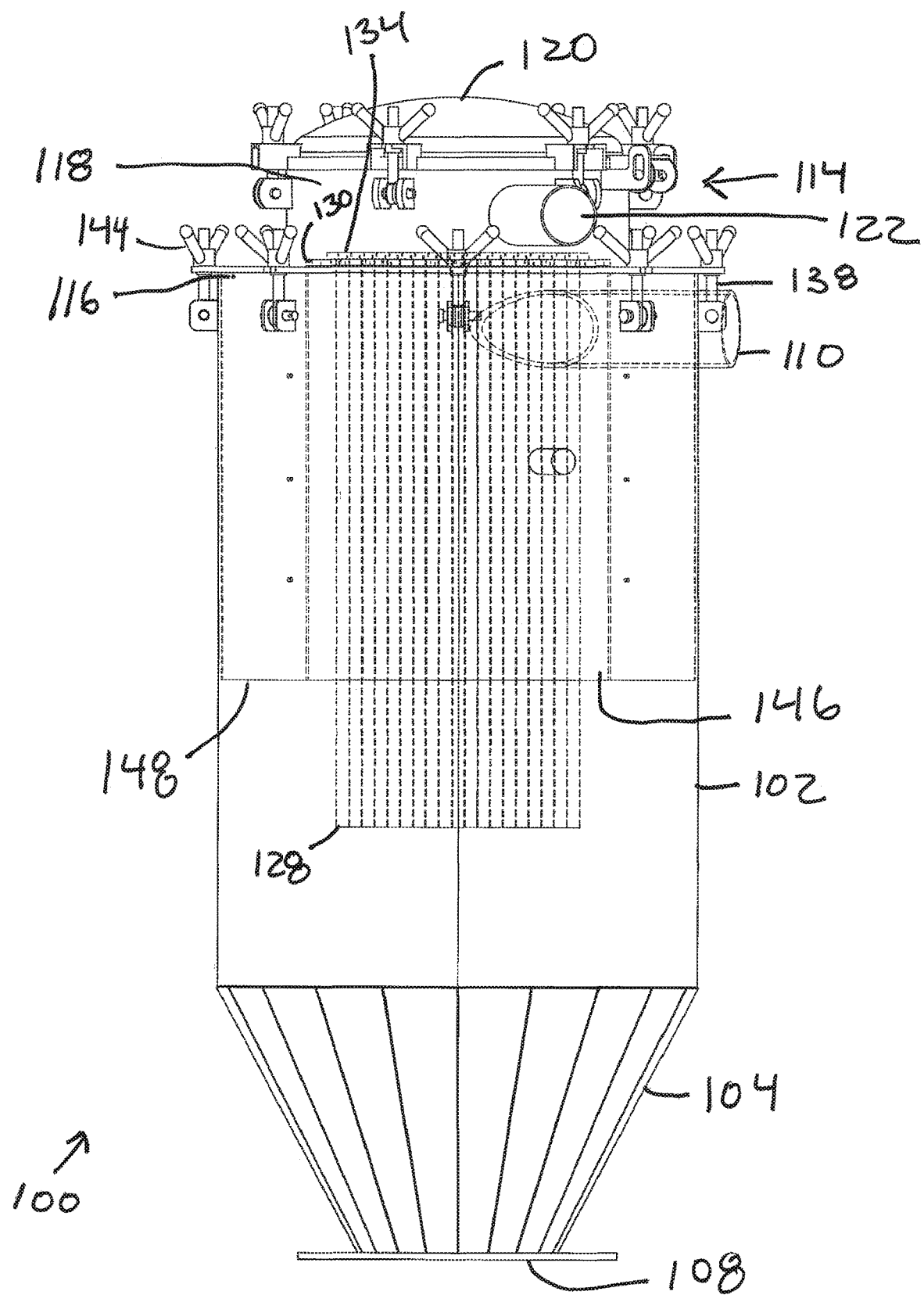
FIG. 11 is a side view of a discharge unit according to the present invention.
Figure 12:
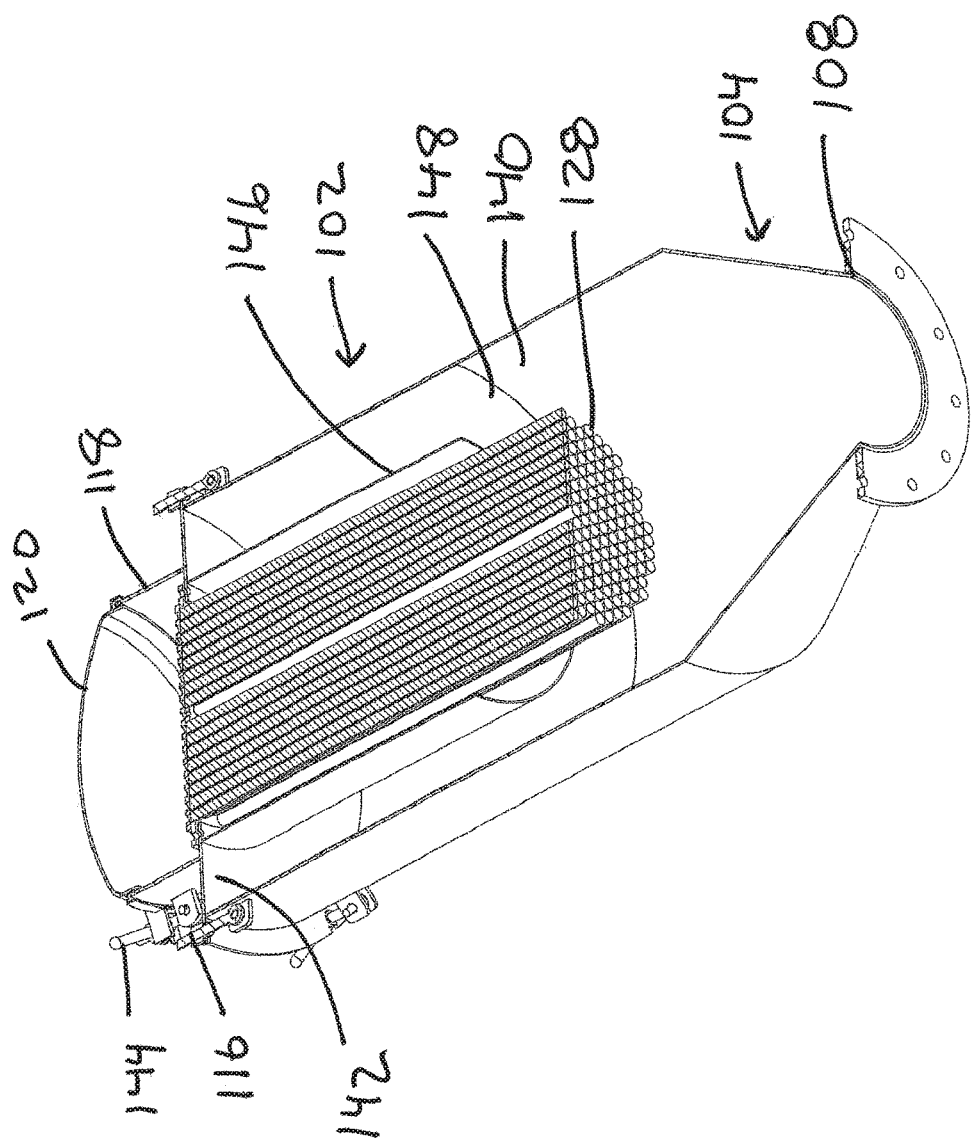
FIG. 12 is a side cross sectional view of a discharge unit according to the present invention.
Figure 13:
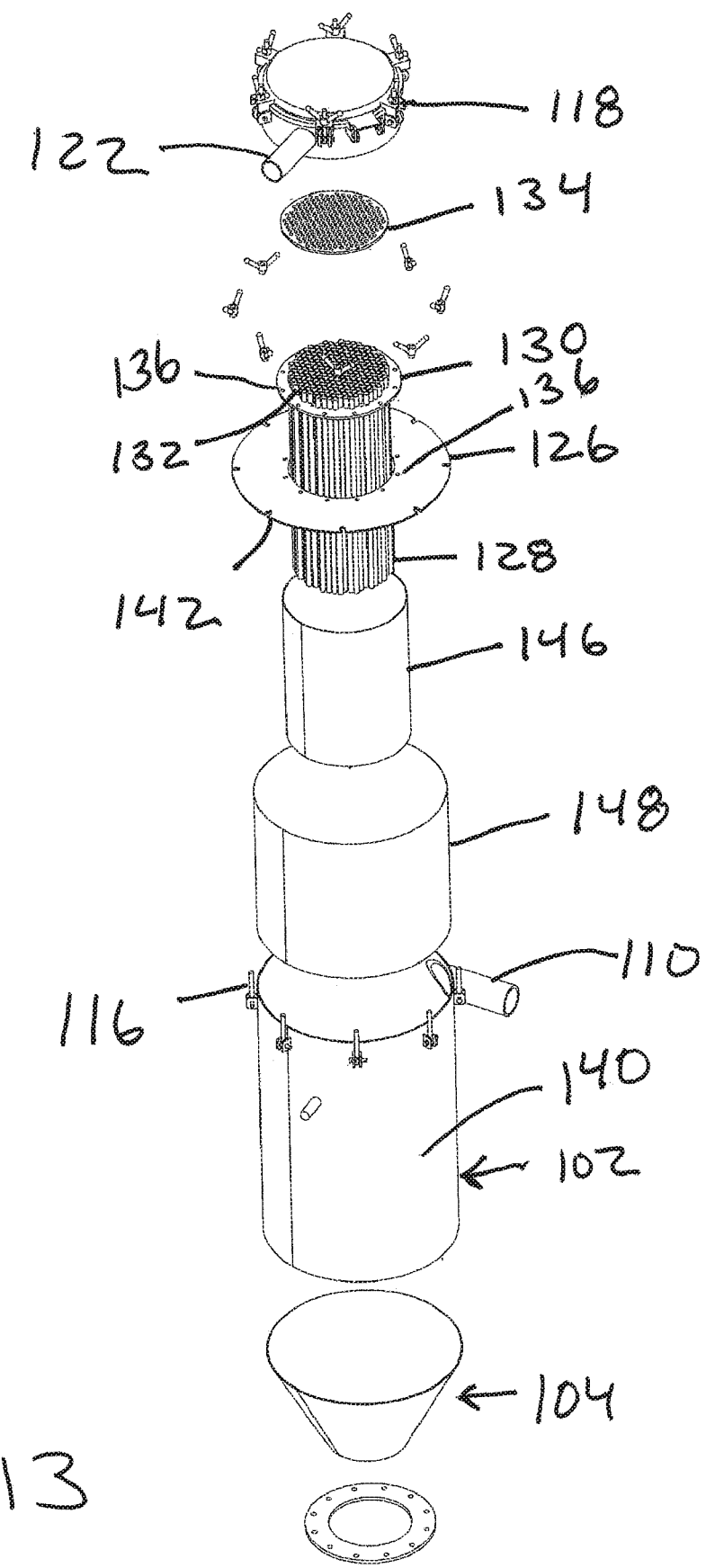
FIG. 13 is an exploded view of a discharge unit according to the present invention.
Figure 14:
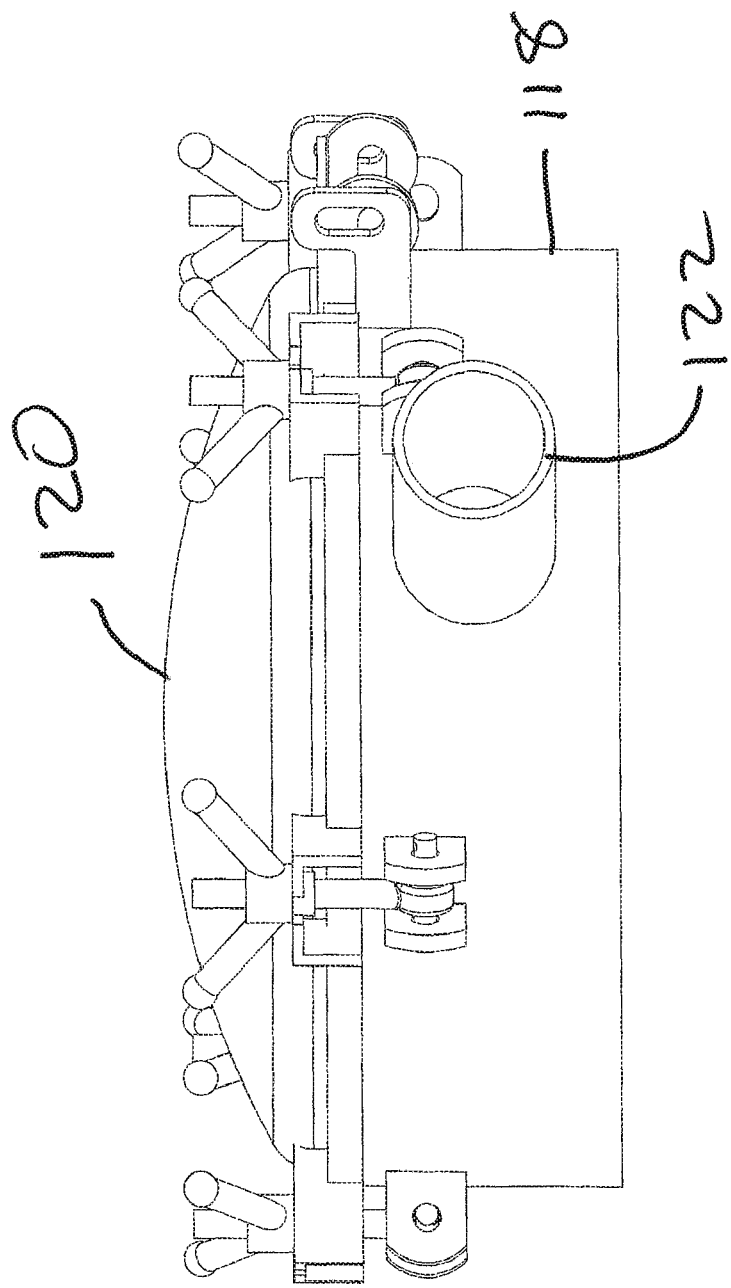
FIG. 14 is a side view of a vacuum head according to the present invention.
Figure 15:
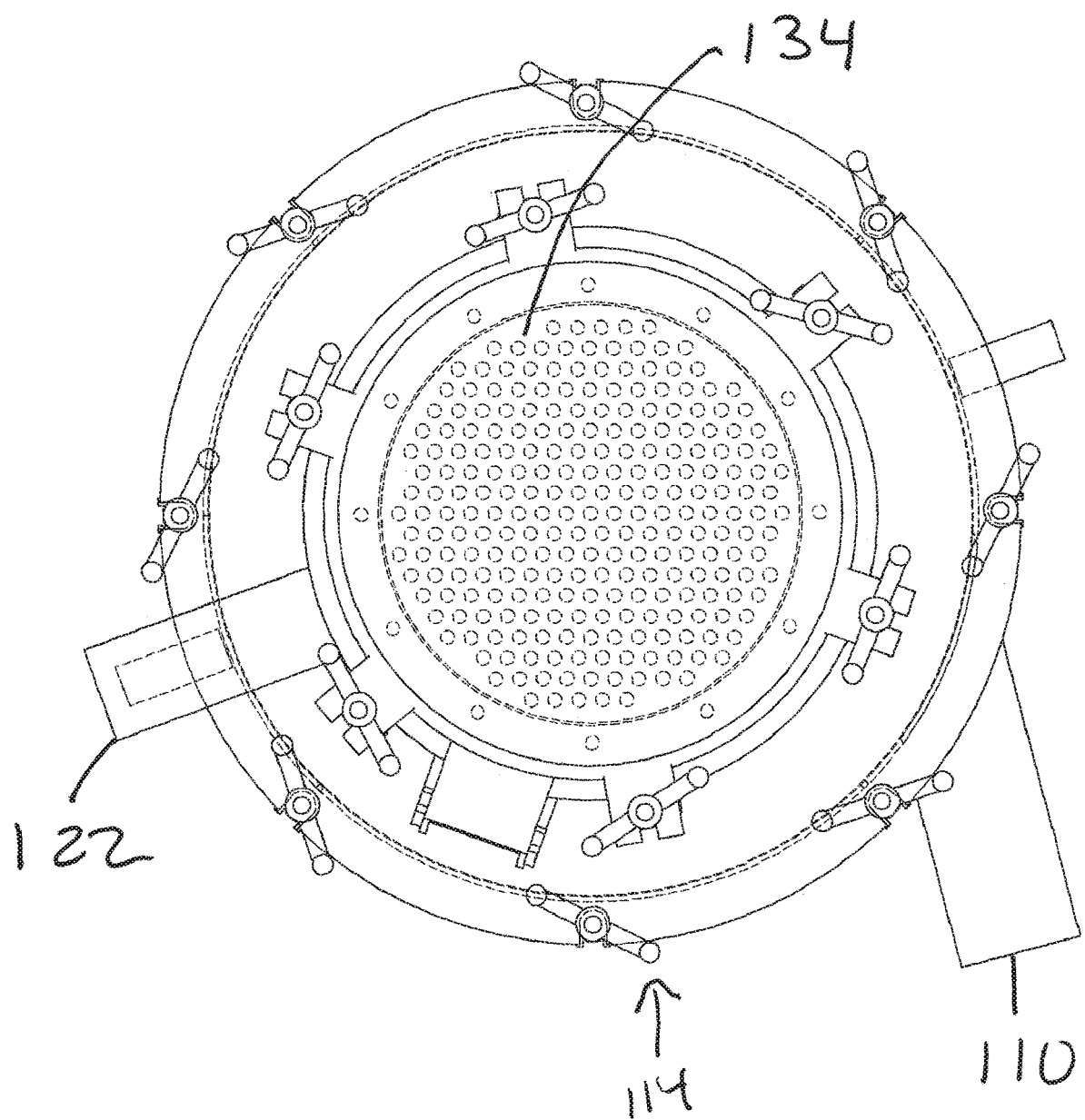
FIG. 15 is a top view of a vacuum head according to the present invention.

FIGS. 8-10 show a discharge unit 100 with an internal dust collector unit to take the place of the discharge unit 14 shown in FIG. 2 and eliminate the separate dust collector unit 12 of FIG. 2. FIG. 8 shows the discharge unit 100 in the stored position on the container 10. FIGS. 9-10 show the discharge unit 100 in the deployed position on the container 10. The discharge unit 100 is shown as a sealed unit with an upper section 102 that is a cylinder that leads to a cone shape bottom 104, as shown in FIGS. 11-13. The cone shape bottom 104 includes a discharge valve 106 at an exit 108 of the cone shape bottom 104. The discharge unit 100 includes inlet port 110 for receiving dry bulk material from discharge hose 112. The internal dust collector unit includes a vacuum head 114 which bolts to the top 116 of an open end of the upper section 102, as shown in FIG. 11-16. The vacuum head 114 includes a body 118 and a cap 120, as shown in FIG. 14. The vacuum head 114 includes a suction port 122 on the body 118 to connect to the main vacuum line 124. The body 118 of the vacuum head 114 is welded to a main ring 126. The internal dust collector unit includes a series of down tubes 128 that provide a vacuum pull as dry bulk material is discharged. The down tubes 128 are mounted to a bottom down tube plate 130 that has holes to receive the down tubes 128. A beginning section of a first end 132 of the down tube 128 has a larger outside diameter then the rest of the down tube 128, so when the down tubes 128 are inserted into the holes of the bottom down tube plate 130, the down tubes 128 hang from the bottom down tube plate 130. The bottom down tube plate 130 is inserted into the body 118 and against the main ring 126 so that the down tubes 128 hang down into the upper section 102 of the discharge unit 100. The internal dust collector unit includes a top down tube plate 134 with a series of holes, which is placed on top of the first end 134 of the down tubes 128, so that the holes align with the open ends of the down tubes 128. The bottom tube plate 130 and top tube plate 134 have bolt holes 136 that align with bolt holes 136 on the main ring 126, so the assembly of the bottom tube plate 130, down tubes 128 and top tube plate 134 can be drop in from a top of the body 118 with the cap 120 removed and bolted to the main ring 126. FIG. 15 shows a top view of the vacuum head 114. FIG. 11-13 shows the use of bolts 136 that are rotatably mounted to an outside shell 140 of the upper section 102. The bolts 138 are rotated up into catch slots 142 of main ring 126 to hold down internal dust collector unit to the upper section 102. Wing nuts 144 are used with the bolts 138 to attach and clamp down the internal dust collector unit to upper section 102.

An aluminum shield 146 is shown welded to the main ring 126. The shield 146 hangs down between the outer shell 140 of the discharge unit 100 and the down tubes 128. The shield 146 acts as a barrier and protects the down tubes 128 from the dry bulk material, as the dry bulk material is forced into the discharge unit 100. The discharge unit 100 also includes a replaceable stainless steel sleeve 148 on the inside of the upper section 102 to protect the outer shell 140 from the dry bulk material, as the dry bulk material is forced into the discharge unit 100. During the process, the shape of the discharge unit 100 provides a cyclonic action as the dry bulk material drops downward toward the exit 108. This cyclonic action allows the heavier material to drop, while the dust particles get caught up in the vacuum that is applied. The dust particles cling to the outside of the down tubes 128. When the collection of dust on a down tube 128 becomes heavy enough, the material will fall towards and out of the exit 108. When using the discharge unit 100, the discharge hose 112 can be connected directly to the diverter Y-pipe 70 or to the product discharge pipe 60. Also, the pre-unloading procedure is no longer performed.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

I claim:

1. A dry material delivery system adapted for unloading dry bulk material from a container, comprising:
    a dust collector unit;
    a main vacuum line directly connected to said dust collector unit, said vacuum line adapted to be attached to a vacuum source to pull a vacuum on inside of said dust collector unit;
    a discharge unit, said discharge unit adapted to be attached to the container such that said discharge unit is movable about the container;
    a direct connection between said dust collector unit and said discharge unit, said dust collector unit and said discharge unit linked by said direct connection such that the vacuum applied by said main vacuum line causes suction to pull dust from said discharge unit; and
    a product hose directly connected to said discharge unit, said product hose adapted to be attached to a product discharge of the container to allow flow of dry bulk material from the container to said discharge unit.

2. The dry material delivery system of claim 1, wherein said direct connection is a discharge dust collection hose directly attached between said dust collector unit and said discharge unit, said discharge dust collection hose connected to said dust collector such that the vacuum applied by said main vacuum line causes suction to pull dust from said discharge unit as flow of dry bulk material moves through said discharge unit.

3. The dry material delivery system of claim 1, further including a container dust collection pipe connected to said dust collector unit, said container dust collection pipe adapted to be connected to the container to pull dust from the container to said dust collector unit.

4. The dry material delivery system of claim 1, wherein said dust collector unit is a cylinder shape container with a cone shape bottom at a bottom of said cylinder shape container.

5. The dry material delivery system of claim 1, wherein said discharge unit includes an upper section and a cone shape bottom; wherein said upper section includes a vacuum head; wherein said vacuum head includes a suction port which leads into a down tube, said down tube projecting downward inside of said upper section, said down tube is designed to collect dust in said discharge unit and send the dust out said suction port when a vacuum is applied at said suction port; wherein said cone shape bottom includes a discharge valve at an exit of said cone shape bottom; wherein said discharge unit includes an inlet port to receive the dry bulk material such that said inlet port leads into said upper section to allow the dry bulk material to drop downward toward said exit of said cone shape bottom; and wherein said inlet port is near a top of said discharge unit and above a bottom of said down tube.

6. The dry material delivery system of claim 1, wherein said discharge unit includes an upper section and a cone shape bottom, said cone shape bottom includes a discharge valve at an exit of said cone shape bottom; wherein said discharge unit includes an inlet port to receive the dry bulk material such that said inlet port leads into said upper section to allow the dry bulk material to drop downward toward said exit of said cone shape bottom; and wherein said inlet port is near a top of said discharge unit; wherein said dust collector unit is internal to said discharge unit to form said direct connection; wherein said discharge unit includes a vacuum head that attaches to and seals an open end of said upper section; wherein said vacuum head includes a body; wherein said vacuum head includes a suction port on said body to connect to said main vacuum line, wherein said vacuum head includes a series of down tubes that project downward into the upper section to provide a vacuum pull as dry bulk material is discharged.

7. The dry material delivery system of claim 6, wherein said dust collector unit includes a shield about said down tubes between an outer shell of said upper section and said down tubes.

8. The dry material delivery system of claim 7, wherein said discharge unit includes a replaceable stainless steel sleeve on an inside of said upper section to protect said outer shell from the dry bulk material, as the dry bulk material is forced into said discharge unit.

9. A method of collecting dust during unloading of dry bulk materials from a container, comprising;
    directly connecting a dust collector unit to a discharge unit;
    directly connecting a main vacuum line to the dust collector unit;

connecting a product hose from the container to the discharge unit;

applying a vacuum to the dust collector unit using the main vacuum line;

blowing dry bulk material through the product hose into the discharge unit and out of an exit of the discharge unit; and collecting dust emanating from the dry bulk material inside of the discharge unit due to the direct connection between the dust collector unit and the discharge unit when the vacuum is applied to the dust collector unit.

10. A method of collecting dust during unloading of dry bulk materials from the container of claim 9, further including inducing a cyclonic action as the dry bulk material drops downward toward the exit of the discharge unit, so as to allow heavier material of the dry bulk material to drop, while dust particles get caught up in the vacuum that is applied.

\* \* \* \* \*